United States Patent
Benhammadi (10) Patent No.: US 12,271,607 B2
(45) Date of Patent: Apr. 8, 2025

(54) METHOD FOR MANAGING A ZONE OF SENSITIVE DATA IN A FLASH MEMORY

(71) Applicant: STMicroelectronics (Alps) SAS, Grenoble (FR)

(72) Inventor: Jawad Benhammadi, Pont de Claix (FR)

(73) Assignee: STMicroelectronics (Alps) SAS, Grenoble (FR)

( * ) Notice: Subject to any disclaimer, the term of this patent is extended or adjusted under 35 U.S.C. 154(b) by 0 days.

(21) Appl. No.: 18/318,416

(22) Filed: May 16, 2023

(65) Prior Publication Data
US 2023/0384953 A1   Nov. 30, 2023

(30) Foreign Application Priority Data
May 25, 2022   (FR) .................................. 2205047

(51) Int. Cl.
*G06F 3/06* (2006.01)

(52) U.S. Cl.
CPC .......... *G06F 3/0622* (2013.01); *G06F 3/0604* (2013.01); *G06F 3/0655* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20;
(Continued)

(56) References Cited

U.S. PATENT DOCUMENTS 6,611,907 B1 * 8/2003 Maeda ................ G06F 12/0223
                                                                711/170
8,589,764 B2 * 11/2013 Takeuchi ............. G06F 3/0659
                                                                714/763
(Continued)

FOREIGN PATENT DOCUMENTS

WO    2009088709 A2    7/2009

OTHER PUBLICATIONS

A mobile phone-based context-aware video management application; Lahti et al.; Proceedings of the SPIE, vol. 6074, pp. 204-215; 2006; doi 10.1117/12.642204 (Year: 2006).*
(Continued)

*Primary Examiner* — Daniel C. Chappell
(74) *Attorney, Agent, or Firm* — Slater Matsil, LLP (57) ABSTRACT

In an embodiment a method includes modifying or suppressing one or more data values of a non-volatile memory, wherein the one or more data values are stored in a first sector of the non-volatile memory, wherein the first sector is designated as a current sector by one or more selection values stored in the non-volatile memory, wherein modifying or suppressing comprises writing the one or more data values into a second sector of the non-volatile memory, and wherein the second sector is designated as an alternate sector by the one or more selection values.

19 Claims, 10 Drawing Sheets

(58) Field of Classification Search
CPC ........ G06F 2209/00–549; G06F 2211/00–902;
G06F 2212/00–7211; G06F
2213/00–4004; G06F 2216/00–17; G06F
2221/00–2153; G06N 3/00–126; G06N
5/00–048; G06N 7/00–08; G06N 10/00;
G06N 20/00–20; G06N 99/00–007; G06T
1/00–60; G06V 30/00–43; G11B
20/00–24; G11B 33/00–1493; G11C
11/00–5692; G11C 13/00–06; G11C
14/00–009; G11C 15/00–06; G11C
16/00–3495; G11C 17/00–18; G11C
2207/00–229; G11C 2216/00–30; H01L
25/00–50; H01L 2225/00–1094; H03M
7/00–707; H04L 9/00–38; H04L
12/00–66; H04L 41/00–5096; H04L
49/00–9094; H04L 61/00–59; H04L
67/00–75
See application file for complete search history.

(56) References Cited

U.S. PATENT DOCUMENTS

| 8,621,140 | B2* | 12/2013 | Lee | G06F 3/0679 |
| | | | | 711/147 |
| 8,631,191 | B2* | 1/2014 | Hashimoto | G06F 3/0653 |
| | | | | 711/100 |
| 9,383,926 | B2* | 7/2016 | Law | G06F 3/0604 |
| 9,799,399 | B2* | 10/2017 | Lee | G11C 13/0097 |
| 9,886,214 | B2* | 2/2018 | Micheloni | G06F 3/0604 |
| 10,554,401 | B1* | 2/2020 | Lee | G06Q 20/227 |
| 10,719,606 | B2* | 7/2020 | Sanchez Diaz | G06F 21/606 |
| 10,887,097 | B1* | 1/2021 | Lee | H04L 9/3239 |
| 2009/0222500 | A1* | 9/2009 | Chiu | G06F 21/78 |
| 2013/0212323 | A1* | 8/2013 | Hashimoto | G06F 3/0653 |
| | | | | 711/103 |
| 2020/0089894 | A1* | 3/2020 | Liu | G06F 3/0679 |
| 2021/0004776 | A1* | 1/2021 | Lee | B42D 25/305 |
| 2021/0005114 | A1* | 1/2021 | Lee | G06K 19/06037 |
| 2021/0006397 | A1* | 1/2021 | Lee | G06Q 20/227 |
| 2021/0034355 | A1 | 2/2021 | Montero et al. | |
| 2021/0103653 | A1* | 4/2021 | Numata | G06F 3/0658 |

OTHER PUBLICATIONS

WebPod: persistent Web browsing sessions with pocketable storage devices. Potter et al. 2005. Proceedings of the 14th international conference on World Wide Web. ACM, pp. 603-612. https://doi.org/10.1145/1060745.1060833 (Year: 2005).*

N. Ravi, C. Narayanaswami, M. Raghunath and M.-C. Rosu, "Securing Pocket Hard Drives," in IEEE Pervasive Computing, vol. 6, No. 4, pp. 18-23, Oct.-Dec. 2007, doi: 10.1109/MPRV.2007.85. (Year: 2007).*

N. Bin et al., "Research and design of Bootrom supporting secure boot mode," 2020 International Symposium on Computer Engineering and Intelligent Communications (ISCEIC), Guangzhou, China, 2020, pp. 5-8, doi: 10.1109/ISCEIC51027.2020.00009. (Year: 2020).*

* cited by examiner

METHOD FOR MANAGING A ZONE OF SENSITIVE DATA IN A FLASH MEMORY

CROSS-REFERENCE TO RELATED APPLICATIONS

This application claims priority to French patent application number 2205047, filed on May 25, 2022, entitled "Méthode pour la gestion d'une zone de données sensible en mémoire FLASH," which is hereby incorporated herein by reference in its entirety.

TECHNICAL FIELD

The present disclosure generally concerns the field of FLASH-type memories.

BACKGROUND

A non-volatile programmable memory, such as an erasable electrically programmable memory (EEPROM), enables to store certain data, such as cipher keys or configuration parameters, in electronic devices even when the electronic devices are disconnected. However, given the technology used to implement an EEPROM, the latter can generally not be integrated on a chip. External (off-chip) implementations of EEPROMs then cause an increase in the surface area, in the power consumption, and in costs.

A FLASH-type memory can however be implemented on a chip. However, a FLASH memory has certain access constraints. For example, conversely to an EEPROM, it is not possible to overwrite or to individually modify data values of a FLASH memory. Accordingly, there exist technical problems linked to the use of an on-chip FLASH memory to implement a memory storage similar to that provided by an EEPROM.

SUMMARY

Embodiments provide access to and manipulation of sensitive data of a FLASH memory. Various embodiments overcome all or part of the known disadvantages of FLASH memories.

An embodiment provides a method comprising:
the modification or suppression of one or more data values of a non-volatile memory, the one or more of data values being stored in a first sector of the memory, the first sector being designated as a current sector by one or more selection values stored in the non-volatile memory, the modification or suppression comprising:
the writing of one or more data values into a second sector of the non-volatile memory, the second sector being designated as an alternate sector by the one or more selection values.

According to an embodiment, the modification or suppression comprises the modification of a first data value stored at a first location, in association with a first address, of the first memory sector, and the writing of one or more data values into the second sector comprises:
the writing of a second data value into a first location of the second sector of the non-volatile memory, the first location of the second sector being at least partly designated by the first address.

According to an embodiment, the one or more selection values comprises a first selection value stored in the first sector.

According to an embodiment, the one or more selection values further comprises a second selection value stored in the second sector.

According to an embodiment, the above method comprises, following power up of the non-volatile memory:
the reading of the first and second selection values;
the determination, based on the first and second selection values, of the sector designated as alternate; and
if at least one data value is contained in the sector designated as an alternate sector, the reinitializing of the alternate sector.

According to an embodiment, the modification or suppression comprises a suppression of other first data values, and the first sector comprises a first address range comprising the other first data values associated with a first level value as well as a second address range comprising second data value associated with a second level value, the second level value being greater than the first level value and wherein the suppression comprises:
the generation of the second level value by a monotonic counter;
the writing of the second data values in association with the first counting value into the second sector;
the writing of a second selection value into the second sector, designating the first sector as the alternate sector and the second sector as the current sector; and
the reinitializing of the first sector.

According to an embodiment, the above method further comprises:
the writing of a second selection value into the second sector, designating the first sector as the alternate sector and the second sector as the current sector; and
the reinitializing of the first sector.

According to an embodiment, the above method further comprises, before the writing of the second selection value into the second sector:
the writing of one or more other data values, stored in the first sector, into the second sector.

According to an embodiment, the above method further comprises, following the writing of said one or more other data values into the second sector, the modification or suppression of one or more the values stored in the second sector and the writing of a third selection value, different from the first and second selection values, into the first sector, designating the first sector as the current sector and the second sector as the alternate sector.

According to an embodiment, each of the first, second, and third selection values is different from the other selection values by the values of at least two bits.

According to an embodiment, the above method further comprises:
the reading of the state of a bit stored in a register; and
the writing of one or more data values into the current sector when the bit is in a first state, or the writing of the one or more data values into the alternate sector when the bit is in a second state.

According to an embodiment, the non-volatile memory is a FLASH-type memory.

An embodiment provides a device comprising:
a non-volatile memory comprising one or more data values, stored in a first sector of the memory, the memory further comprising a second sector as well as one or more selection values designating the first sector as a current sector and designating the second sector as an alternate sensor; and an access controller configured to modify or suppress the one or more data values by writing one or more other data values into the second sector of the non-volatile memory.

According to an embodiment, the access controller is configured to modify a first data value stored at a first location of the first memory sector, in association with a first address, by writing a second data value at a first location of the second sector of the non-volatile memory, the first location of the second sector being at least partly designated by the first address.

According to an embodiment, the above device further comprises a monotonic counter configured to generate a level value, and the first sector comprises a first address range comprising other first data values associated with a first level value, as well as a second address range comprising second data values associated with a second level value, the second level value being greater than the first level value, the access controller being configured to suppress the one or more other first data values, the suppression comprising:
- the writing of the second data values in association with the first counting value into the second sector;
- the writing of a second selection value, designating the first sector as the alternate sector and the second sector as the current sector; and
- the reinitializing of the first sector.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the design of the processing devices is well known by those skilled in the art and certain elements have not been detailed in the following description.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
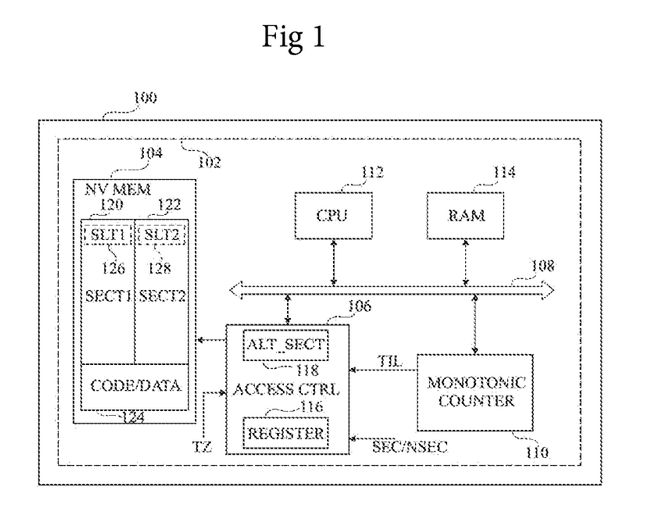
FIG. 1 schematically shows in the form of blocks an electronic device according to an embodiment of the present disclosure.

FIG. 1 very schematically shows in the form of blocks an electronic device 100 comprising an integrated circuit 102 according to an embodiment of the present disclosure.

Electronic device 100 is for example an electronic board such as a microcircuit card, computer equipment, a microprocessor circuit, etc.

Integrated circuit 102 for example comprises a non-volatile memory 104 (NV MEM) of FLASH type. Memory 104 is coupled to an access controller 106 (ACCESS CTRL) implemented, for example, by a hardware circuit, or at least partially by a software implementation. Access controller 106 is for example coupled to a bus 108, bus 108 for example comprising a data bus.

Integrated circuit 102 further comprises, for example, a monotonic counter 110 (MONOTONIC COUNTER) configured to generate counting values. Further, in certain embodiments, integrated circuit 102 also comprises a processor 112 (CPU) and/or a volatile memory 114 (RAM). Volatile memory 114 is for example a random access volatile memory. Monotonic counter 110, processor 112, and volatile memory 114 are for example coupled to access controller 106 via bus 108.

Access controller 106 for example comprises a volatile register 116 (REGISTER) and a volatile or non-volatile register 118 (ALT_SECT). Access controller 106 is for example configured to receive a level value TIL generated by monotonic counter 110. In certain cases, access controller 106 is also configured to receive a signal TZ and/or a signal SEC/NSEC. Signal SEC/NSEC is for example a signal indicating an operation of integrated circuit 102 in a secure (SEC) or non-secure (NSEC) mode. Signal TZ is for example a signal indicating an operation of integrated circuit 102 in a secure mode with a trust zone. Signals TZ and SEC/NSEC are for example transmitted by a circuit for configuring the booting and the security of integrated circuit 102 ("System configuration, Boot and Security"), which configuration circuit is not shown in FIG. 1.

According to an embodiment of the present disclosure, non-volatile memory 104 comprises a first sector 120 (SECT1) and a second sector 122 (SECT2). The memory further comprises an area 124 (CODE/DATA) containing for example codes, such as boot codes and/or application codes, and/or data.

In the applications targeted by the present disclosure and in a usual operating mode, a single one of the two sectors contains data and this sector is designated as being a current sector of non-volatile memory 104, the other sector being designated as being an alternate sector. The use of the two sectors 120 and 122 enables to modify or to suppress, individually, a value of data stored in the current sector. For this purpose, the data value are written into the alternate sector, then the roles of the sectors are for example swapped, the alternate sector becoming the current sector and the current sector becoming the alternate sector.

According to an embodiment, sector 120 comprises a location 126 and sector 122 comprises a location 128. The two locations 126 and 128 are reserved for the storage of one or more selection values SLT1, SLT2. As a result of a booting of non-volatile memory 104, the content of locations 126 and 128 is read and selection values SLT1 and SLT2 enable to identify which among sectors 120 and 122 is the current sector, and which among sectors 120 and 122 is the alternate sector. In an example, each selection value SLT1, SLT2 may be either unprogrammed, that is, the location is blank, or programmed with one among three counting values which will be designated as 0, 1, and 2.

According to an embodiment, a rule is established between counting values 0, 1, and 2 enabling to decide which is the current sector and which is the alternate sector when the two locations 126 and 128 are not blank. As an example, when the programmed selection values are values 0 and 1, the sector containing selection value 1 is the current sector. When the programmed selection values are values 1 and 2, the sector containing selection value 2 is the current sector. When the programmed selection values are values 2 and 0, the sector containing selection value 0 is the current sector.

According to an embodiment, when the location of a sector is blank and the location of the other sector is non-blank, the sector comprising the non-blank location is designated as being the current sector.

According to an example, the selection values are values, expressed hexadecimal digits, 51, 8A, and B4. Values 51, 8A, and B4 are disclosed as an example only and other values may of course be envisaged. Further, as is the case for values 51, 8A, and B4, in certain embodiments, each of the selection values has at least the values of 2 bits differing from the two other selection values.

When the current sector is identified, an indication of the current sector is then stored in register 116. The indication for example takes the shape of bit or of an address complement.

According to an embodiment, locations 126 and 128 are not accessible by software. The contents of locations 126 and 128 can thus not be easily falsified.

According to an embodiment, a bit stored in register 118 can be modified by processor 112, enabling software executed by processor 112 to indicate into which of the current and alternate sectors a data value will be written. As an example, when the bit is at state 0, this means that the current sector is selected for a writing, and when the bit is equal to 1, this translates that the alternate sector is selected for a writing.

Figure 2:
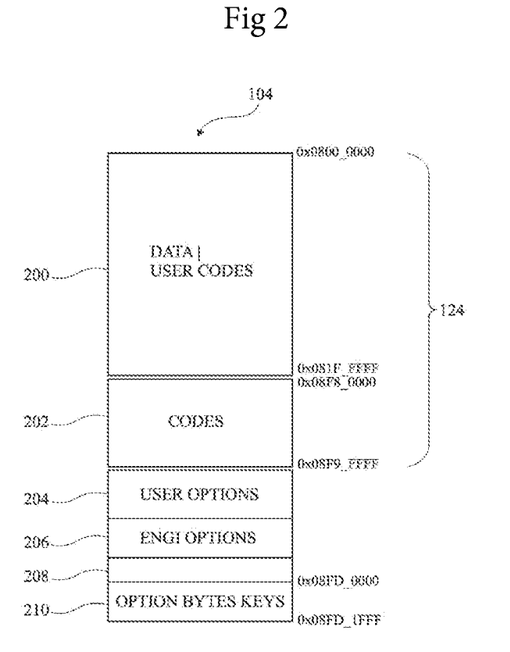
FIG. 2 schematically illustrates in the form of blocks the content of a FLASH memory of the electronic device of FIG. 1 according to an embodiment of the present disclosure.

FIG. 2 schematically illustrates in the form of blocks the content of memory 104 according to an embodiment of the present disclosure.

As an example, memory 104 comprises, in area 124, data and codes 200 (DATA/USER CODES) and codes 202 (CODES). The codes among the data and codes 200 are for example codes configurable by a user of circuit 102 to adapt it to their needs for device 100. Codes 200 are for example non-secured and are for example stored on memory addresses, expressed in hexadecimal values, ranging from 0x081F_FFFF to 0x0800_0000. Codes 202 are for example boot codes stored by the manufacturer of circuit 102 and are for example stored on memory addresses, expressed in hexadecimal value, ranging from 0x0BF9_FFFF to 0x0BF8_0000.

As an example, FLASH memory 104 also comprises an area 204 configured to store parameters of the FLASH memory, such as security parameters 204 (USER OPTIONS), and/or an area 206 (ENG1 OPTION) configured to store configuration parameters, such as configuration parameters of one of a plurality of modules, configuration parameters of integrated circuits 102, parameters of activation or of deactivation of one or more security applications, parameters indicating the size of one or more areas of memory 104, such as for example area 204. The locations of areas 204 and 206 for example do not form part of the address areas mapped in memory 104, that is, they do not form part of the memory space visible and accessible by processor 112.

As an example, area 124 further comprises other codes or data 208.

Non-volatile memory 104 further comprises an area 210 comprising sectors 120 and 122. Sectors 120 and 122, and more particularly the current sector, contain data such as OBK (OPTION BYTES KEYS) keys. Area 210 is for example mapped at the addresses ranging from 0x0BFD_1FFF to 0x0BFD_0000. Area 210 is implemented by sectors 120 and 122 and the two sectors are then visible from the outside as a single address range.

The memory addresses are only disclosed for illustration purposes and are of course not limiting. Other sizes and locations of the different areas and of sectors 120 and 122 may of course be envisaged.

Figure 3:
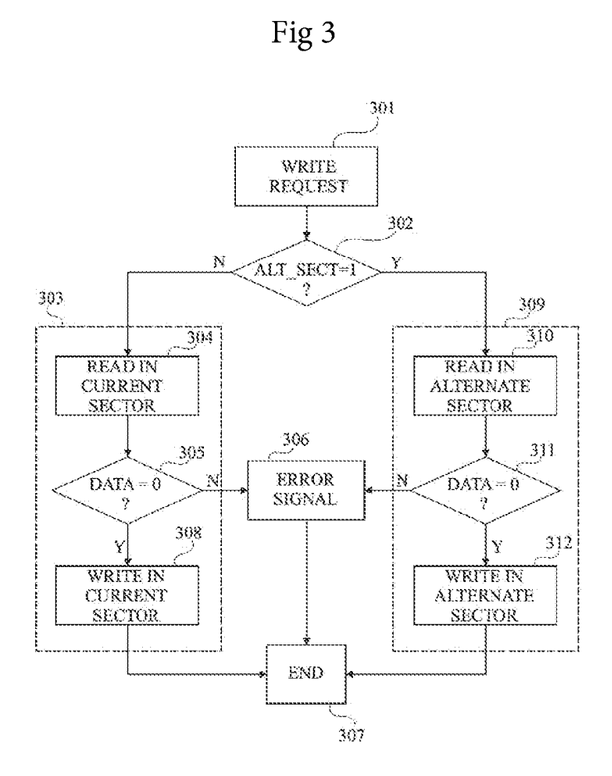
FIG. 3 is a flowchart showing operations of a method of writing into a FLASH memory according to an example of embodiment of the present disclosure.

FIG. 3 is a flowchart showing operations of a method of writing into memory 104 according to an example of embodiment of the present disclosure. This method is for example implemented by processor 112 and by access controller 106.

Device 100, and in particular memory 104, is then booted and in a usual operating mode. Register 116 then contains the indication of the sector which is current, for example, sector 120.

At a step 301 (WRITE REQUEST), a request to write a data value into one of the sectors is initiated by processor 112, the request being for example accompanied by a memory address. As an example, prior to the write request, processor 112 is configured to further program the state of the bit of register 118 to indicate whether the writing is to be done into the current sector or into the alternate sector.

At a step 302 (ALT_SEC=1?), access control circuit 106 is configured to read the content of register 118.

As an example, if the bit contained in register 118 is at state 0 (branch N), the method continues in a sequence of steps 303.

The sequence of steps 303 comprises a step 304 (READ IN CURRENT SECTOR) where processor 112 reads the data currently stored in the current sector at the memory address indicated at step 301.

At a step 305 (DATA=0?), processor 112 determines whether the data read at step 304 is null, in other words whether the memory location associated with the address indicated at step 301 is blank or not. In the case where the location is not blank (branch N), and accordingly where a data value is already stored in the location, the method continues at a step 306 (ERROR SIGNAL) where access controller 106 for example transmits an error signal to processor 112. The method then ends at a step 307 (END).

If it is determined at step 305 that the memory location is blank (branch Y), the method continues at a step 308 (WRITE IN CURRENT SECTOR) of the sequence of steps 303.

At step 308, the data value is written into the current sector, and more precisely, at the location of the current sector indicated by the memory address.

If, at step 302, it is determined that the bit contained in register 118 has value 1 (branch Y), the method continues in a sequence of steps 309 similar to the sequence of steps 303, with the difference that the operations are performed in the alternate sector.

Thus, the sequence of steps 309 comprises a step 310 (READ IN ALTERNATE SECTOR), a step 311 identical to step 305, and a step 312 (WRITE IN ALTERNATE SECTOR).

After the implementation of step 308 or 312, the method ends at step 307.

Figure 4:
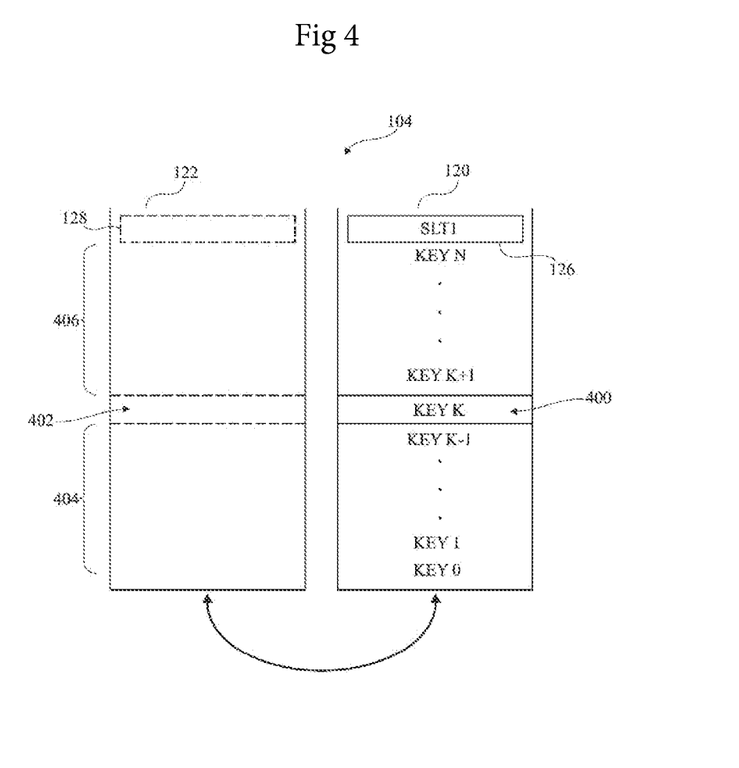
FIG. 4 schematically illustrates the content of the sectors of a FLASH memory on implementation of a data modification method.

FIG. 4 schematically illustrates the content of sectors 120 and 122 of memory 104 during the implementation of a data modification method.

As an example, a selection value (SLT1) is stored at location 126, the selection value designating sector 120 as being the current sector.

Current sector 120 comprises, for example, a number N+1, N being an integer, of keys, such as OBK keys, designated as KEY i, i being the range from 0 to N.

As an example, the key KEY K stored at a location 400 in association with a memory address is obsolete and has to be modified or updated. However, memory 104 being a FLASH-type memory, it is not possible to modify the value of key KEY K individually. Indeed, it is only possible to write values into blank locations of the sector or to entirely overwrite the content of sector 120.

According to an embodiment, a new key value is written into a location 402, associated with the same address as location 400, of alternate sector 122. The writing of the new value into the alternate sector is for example performed according to the method described in relation with FIG. 3.

Figure 5:
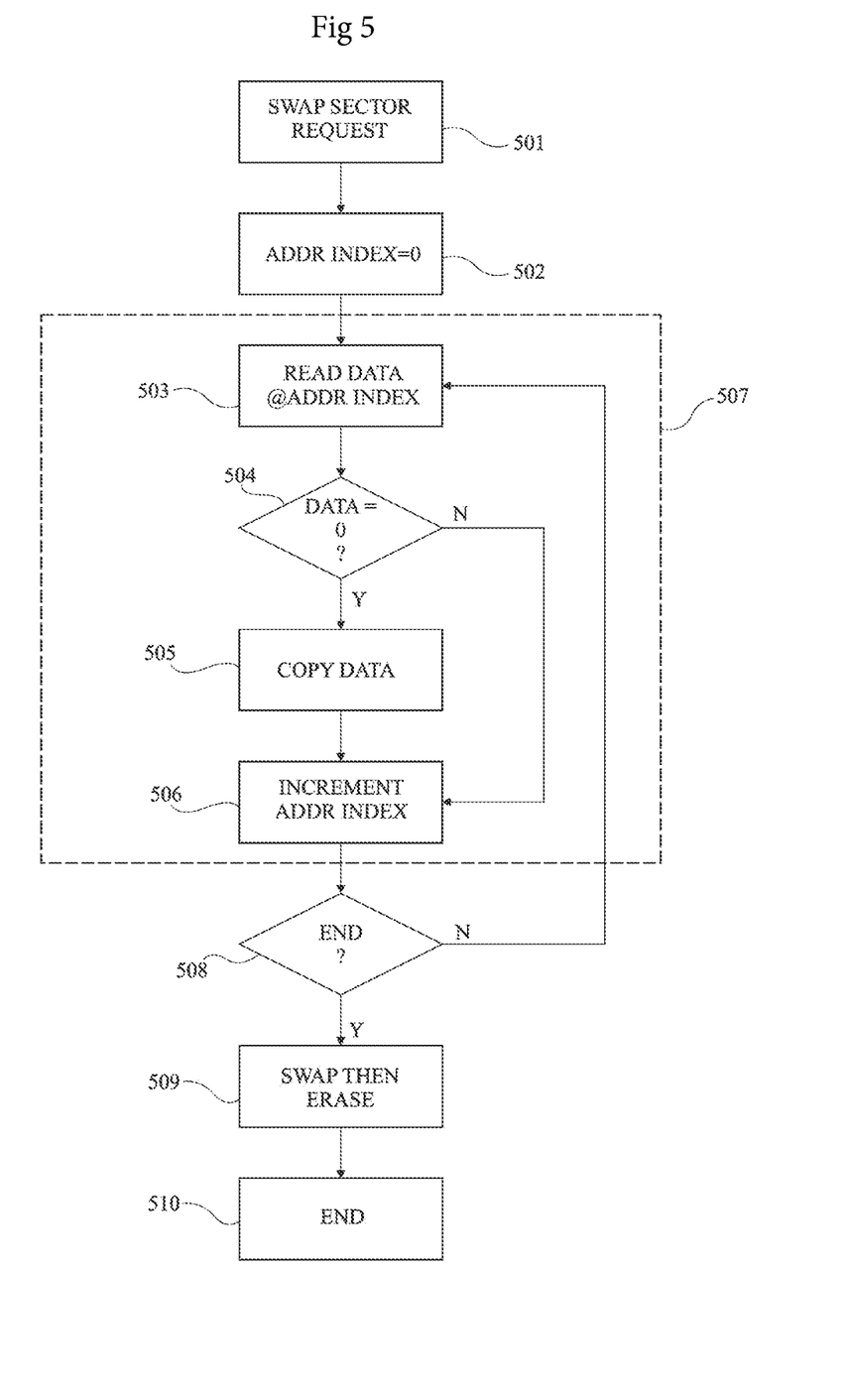
FIG. 5 is a flowchart showing operations of a sector swapping method according to an example of embodiment of the present disclosure.

FIG. 5 is a flowchart showing operations of a sector swapping method. More particularly, the flowchart shown in FIG. 5 shows operations performed after a modification of data of the current sector, as described in relation with FIG. 4. The method of FIG. 5 is for example implemented by processor 112 and by access controller 106.

As an example, a modification of key KEY K has been performed, as described in relation with FIG. 4. Current sector 120 then comprises keys KEY 0 to KEY N, with key KEY K being stored at location 400. Current sector 120 then further comprises selection value SLT1, stored at location 126. Alternate sector 122 only comprises the modification of key KEY K, stored at location 402, location 402 being designated by a same address as location 400.

After the storage of the modification of key KEY K at location 402, a sector swapping request is initiated at a step 501 (SWAP SECTOR REQUEST).

At a step 502 (ADDR INDEX=0), an index value, for example corresponding to an address designating a memory location, is initialized. As an example, at this step, the index value corresponds to the address designating the memory location of sector 120 containing key KEY 0.

At a step 503 (READ DATA @ADDR INDEX), the content of the memory location of alternate sector 122 and designated by the index value is for example read. Processor 112 then determines, at a step 504 (DATA=0) if the memory location of the alternate sector associated with the index value is blank. If the location is effectively blank (branch Y), the method continues at a step 505 (COPY DATA) where, for example, key KEY 0 is rewritten into the location of the alternate sector 122 associated with the index value.

If, at step 504, it is determined that the memory location of the alternate sector 122 designated by the index value is not blank (branch N), the method directly skips to a step 506 (INCREMENT ADDR INDEX).

At step 506 (INCREMENT ADDR INDX), subsequent to step 505, or possibly to step 504, the index value is incremented. As an example, the index value then corresponds to the memory address designating the location of key KEY 1 in current sector 120.

The succession of steps 503 to 506 will be designated in the rest of the disclosure as being a sequence of steps 507.

At a step 508 (END?), it is determined, for example by comparing the index value with a limiting index value, whether memory locations of current sector 120 remain to be scanned. As an example, the limiting index value corresponds to the address designating the memory location of sector 120 having key KEY N stored therein. If there remain memory locations to be scanned (branch N), the method resumes at step 503.

As an example, when, after an implementation of step 506 where the index value is incremented towards the index value designating the memory location of sector 122 where the modification of key KEY K has been previously stored, the location will be seen as non-blank on implementation of step 504.

In the case where it is determined, at step 508, that there remain no further locations to be scanned (branch Y), the method carries on at a step 509 (SWAP THEN ERASE).

As an example, at this step of the method, alternate sector 122 comprises keys KEY 0 to KEY K−1 in memory locations 404, the modification of key KEY K at location 402, and keys KEY K+1 to KEY N at locations 406.

At step 509, a selection value, different from the selection value stored at location 126 of sector 120, is stored at location 128 of sector 122. As an example, when the selection value SLT1 of current sector 120 is designated by counting value 0, 1, or 2, the selection value stored in alternate sector 122 will respectively be 1, 2 or 0.

As a result of the storage of the new selection value, alternate sector 122 becomes the current sector, and current sector 120 becomes the alternate sector. The entire alternate sector 120 is then erased. Accordingly, selection value SLT1, at location 126, is also erased.

The advantage of suppressing the content of alternate sector 120 only once the selection values have been updated is that the designation of the current and alternate sectors is saved. Accordingly, if electronic device 100 is off for any reason before or during the suppression of alternate sector 120, at the reboot, a reading of the selection values of locations 126 and 128 is performed and enables to identify that sector 122 is the current sector.

In certain cases, after the suppression of the entire alternate sector, the content of locations 126 and 128 is then read. Due to the fact that location 126 is blank, only the selection value of sector 122 is detected, meaning that sector 122 is now the current sector of memory 104. The content of register 116 is then updated, to indicate that the current sector is sector 122.

Although FIG. 5 shows an example where the data stored in the sectors are keys, the method may apply to any type of data.

Figure 6:
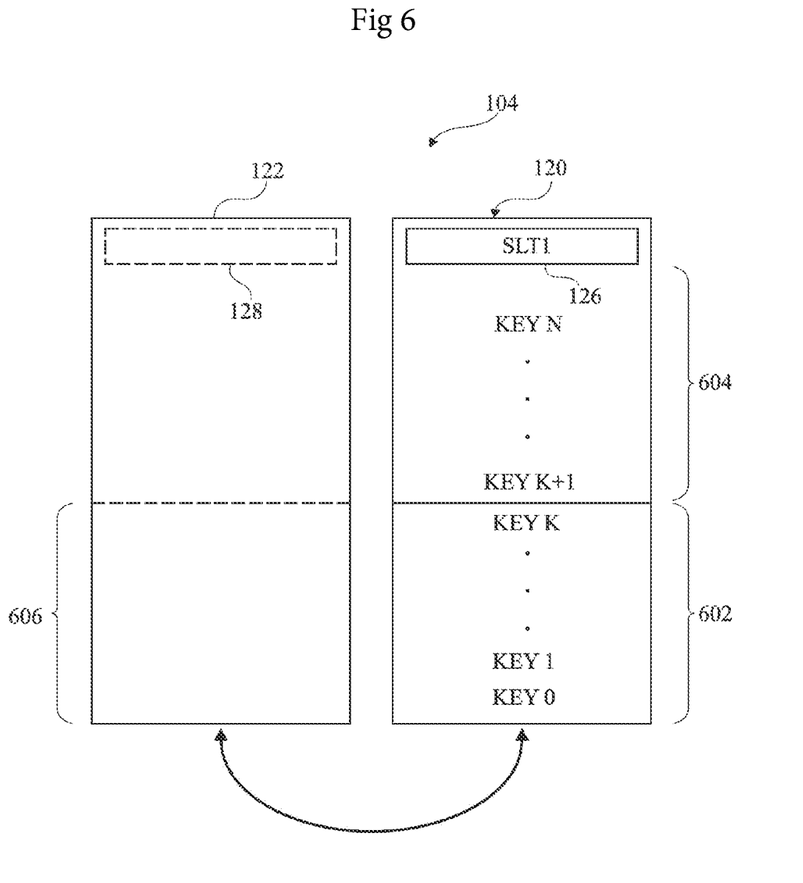
FIG. 6 schematically illustrates the content of the sectors of the FLASH memory on implementation of a method of suppression of one or more data.

FIG. 6 schematically illustrates the content of sectors 120 and 122 of memory 104 on implementation of a method of suppression of one or more data.

As an example, and similarly to FIG. 3, the selection value (SLT1) is stored at location 126, the selection value designating sector 120 as being the current sector.

Current sector 120 for example comprises the N+1 keys OBK, designated as KEY i, i being in the range from 0 to N, keys KEY 0 to KEY K being stored at locations 602, and keys KEY K+1 to KEY N being stored at locations 604.

As an example, the suppression of keys KEY K+1 a KEY N is controlled, for example, by controller 106. However, memory 104 being a FLASH-type memory, it is not possible to suppress keys KEY K+1 to KEY N individually without suppressing the entire sector 120 and accordingly keys KEY 0 to KEY K.

According to an embodiment, key values KEY 0 to KEY K are then rewritten at locations 606 of alternate sector 122. Locations 606 are then designated with the same addresses as those designating locations 602.

Figure 7:
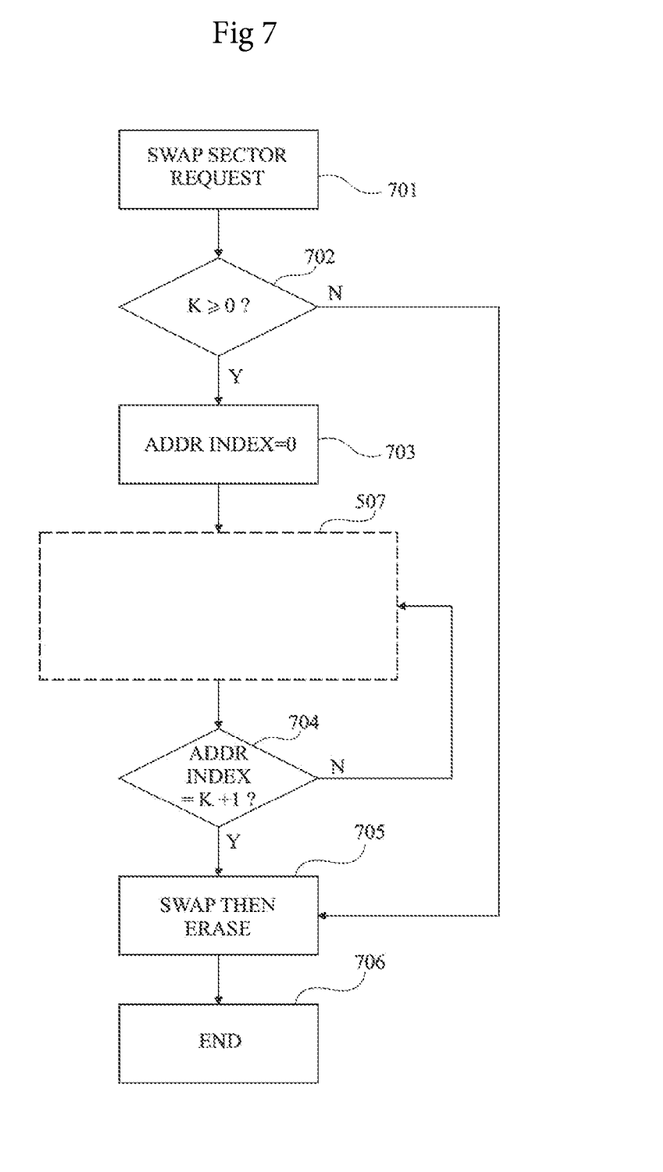
FIG. 7 is a flowchart showing operations of a sector swapping method according to an example of embodiment of the present disclosure.

FIG. 7 is a flowchart showing operations of a method of suppression of one or more data comprised within memory 104, and more particularly of data comprised within the current sector. The method of FIG. 7 is for example implemented by processor 112 and by access controller 106.

As an example, as described in relation with FIG. 6, current sector 120 comprises keys KEY 0 to KEY K, stored at locations 602 of the current sector and keys KEY K+1 to KEY N stored at locations 604 of the current sector. Current sector 120 further comprises selection value SLT1, stored at location 126. Alternate sector 122 is then empty, that is, all the memory locations forming it are empty.

A request for suppressing keys KEY K+1 to KEY N and for swapping sector is initiated at a step 701 (SWAP SECTOR REQUEST).

At a step 702 (K≥0?), a number K+1 of data values to be rewritten into alternate sector 122 is designated. Number K+1 corresponds to a number of data of the current sector to be transferred into the alternate sector before proceeding to the exchange between the current sector and the alternate sector. As an example, the number of data values to be rewritten corresponds to the number of keys forming the assembly of keys KEY 0 to KEY K, keys KEY K+1 to KEY K being meant to be suppressed. If at least one data value is to be rewritten (branch Y), the method continues at a step 703 (ADDR INDEX=0).

At step 703, an index value, corresponding for example to an address designating a memory location, is initialized. As an example, at this step, the index value corresponds to the address designating the memory location of sector 120 containing key KEY 0.

After step 703, the method continues in the sequence of steps 507 where the content of the memory location of sector 120 and designated with the index value is rewritten into the memory location of sector 122 and designated with the same index value, provided for the latter to be blank. As an example, the value of key KEY 0 is written into sector 122 during these steps. The index value is then incremented.

After the steps of sequence 507, the method continues at a step 704 (ADDR INDEX=K+1) where it is determined whether all the values to be rewritten into sector 122 have been rewritten, which is for example the case if the index value is equal to K+1. If not, the method resumes at steps 507, where, for example, the value of key KEY 1 is written into sector 122.

If, as a result of step 704, it is determined that all the values to be rewritten have been rewritten (branch Y), the method continues at a step 705 (SWAP AND ERASE) identical to the step 509 described in relation with FIG. 5. Step 705 also follows step 702 when it is determined that no data value is to be rewritten into sector 122 (branch N).

As an example, the values of each of keys KEY 0 to KEY K have been rewritten into sector 122. A selection value, different from value SLT1, is then stored into location 128 of sector 122 and the entire sector 120 is erased. Thus, keys KEY K+1 to KEY N are no longer stored in sectors 120 and 122, they are thus suppressed from memory 104.

The method then ends at a step 706 (END).

As in the method described in relation with FIG. 5, the advantage of suppressing, at step 705, alternate sector 120 only once the selection values have been updated is that the designation of the current and alternate sectors is saved. Accordingly, if electronic device 100 is off for any reason before or during the suppression of alternate sector 120, at the reboot, a reading of the selection values of locations 126 and 128 is performed and enables to identify that sector 122 is the current sector.

Although FIG. 7 shows an example where the data stored at the locations of the sectors are keys, the method may apply to any type of data.

Figure 8:
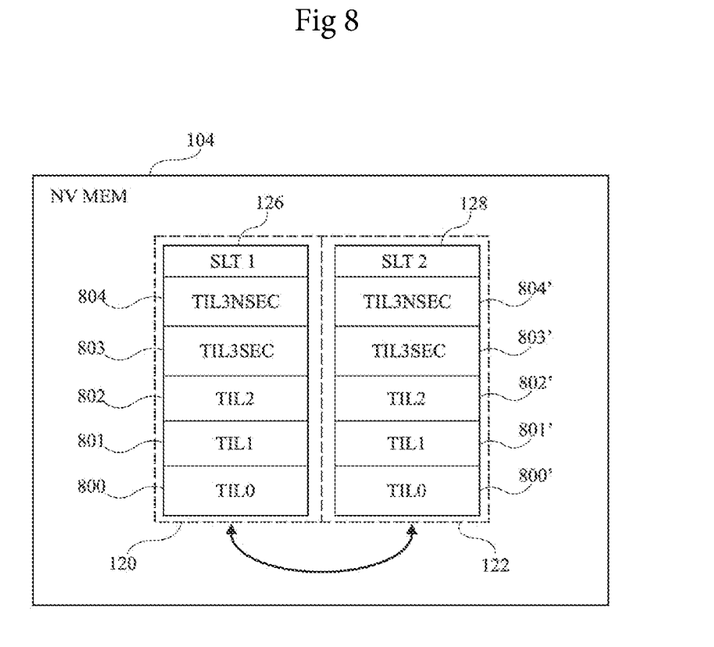
FIG. 8 schematically illustrates in the form of blocks an example of embodiment of a FLASH memory according to an embodiment of the present disclosure.

FIG. 8 schematically illustrates in the form of blocks an example of embodiment of memory 104 according to an embodiment of the present disclosure.

FIG. 8 illustrates different storage areas in sectors 120 and 122. In addition to locations 126 and 128 reserved for the storage of the selection values, each sector 120 and 122 comprises for example 5 areas.

As an example, sector 120 comprises areas 800 to 804 and sector 122 comprises areas 800' to 804'. Each of the areas is associated with a level value TIL (for "Temporal Isolation Level"). For example, at each booting of device 100, a level value is generated by monotonic counter 110. The level value is for example transmitted to controller 106. Thus, an access to an area associated for example with a TIL level value smaller than the level value generated by counter 110 is forbidden by controller 106.

As an example, areas 800 and 800' (TIL 0) are associated with the TIL 0 level value and their access is authorized only when the level value generated by monotonic counter 110 is equal to 0. Similarly, areas 801 and 801' (TIL 1) are associated with the TIL 1 value and are accessible for example only when the level value is equal to 1. In another example, areas 801 and 801' are accessible when the generated level value is smaller than or equal to 1. Similarly, areas 802 and 802' (TIL2) are associated with the TIL 2 value and areas 803, 803' (TIL3SEC) and 804, 804' (TIL3NSEC) are associated with the TIL 3 value.

As an example, controller 106 is further configured to control the suppression of the content of one or more areas when monotonic counter no increments the level value. As an example, the level value is incremented by 0 towards value 1, and the content of the area 800 or 800' associated with the TIL 0 value of the current sector is suppressed according to the embodiment described in relation with FIGS. 6 and 7. Similarly, the content of the areas associated with the other TIL values is for example suppressed when the level value is incremented towards a value being greater than the TIL value associated with said areas.

Figure 9:
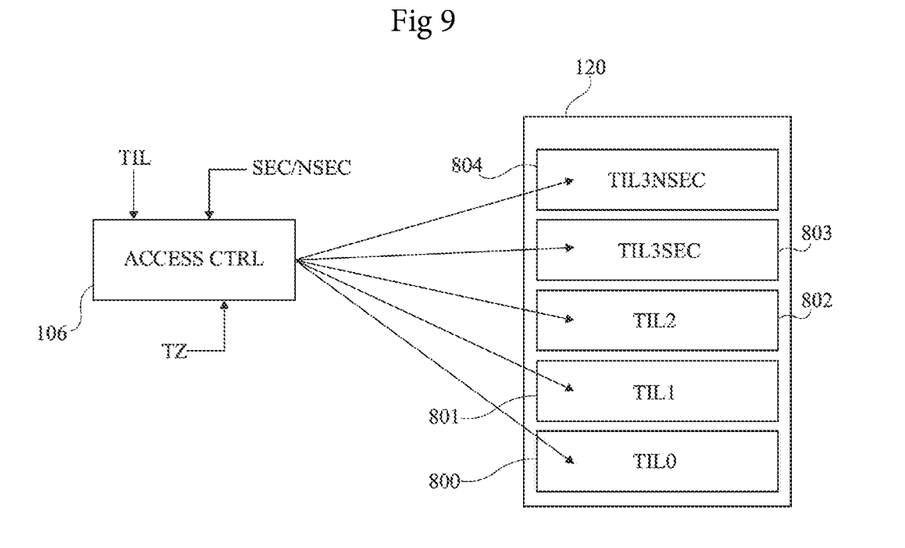
FIG. 9 schematically illustrates a function of control of the access to a FLASH memory according to an embodiment of the present disclosure.

FIG. 9 schematically illustrates a function of control of the access to memory 104, and in particular to the current sector of memory 104.

As an example, the access control function is implemented by access controller 106.

As an example, the case where the current sector is sector 120 is considered. Sector 120 for example comprises the 5 areas 800 to 804 described in relation with FIG. 8.

Access controller 106 is then configured to receive the level value (TIL) generated by monotonic counter 110. As an example, access controller 106 is further configured to forbid the access to one or more areas among areas 800 to 804 based on the received TIL level value. As an example, access controller 106 is configured to forbid any access to the areas being associated with a TIL value smaller than the received level value. In another example, access controller 106 is configured to forbid any access to the areas being associated with a TIL level value different from the received TIL level value.

As an example, access controller 106 is further configured to receive signal SEC/NSEC, indicating an operation of integrated circuit 102 in a secure (SEC) or non-secure (NSEC) mode. As an example, access controller 106 is configured to authorize the access to area 804 and forbid the access to area 803 when circuit 102 is in the non-secure mode.

As an example, access controller 106 is further configured to receive signal TZ, being for example a signal indicating an operation of integrated circuit 102 in a secure mode with a trust zone. As an example, access controller 106 is configured to authorize the access to all areas 800 to 804 when signal TZ is received, and this even when the level value generated by monotonic counter 110 does not allow it.

Figure 10:
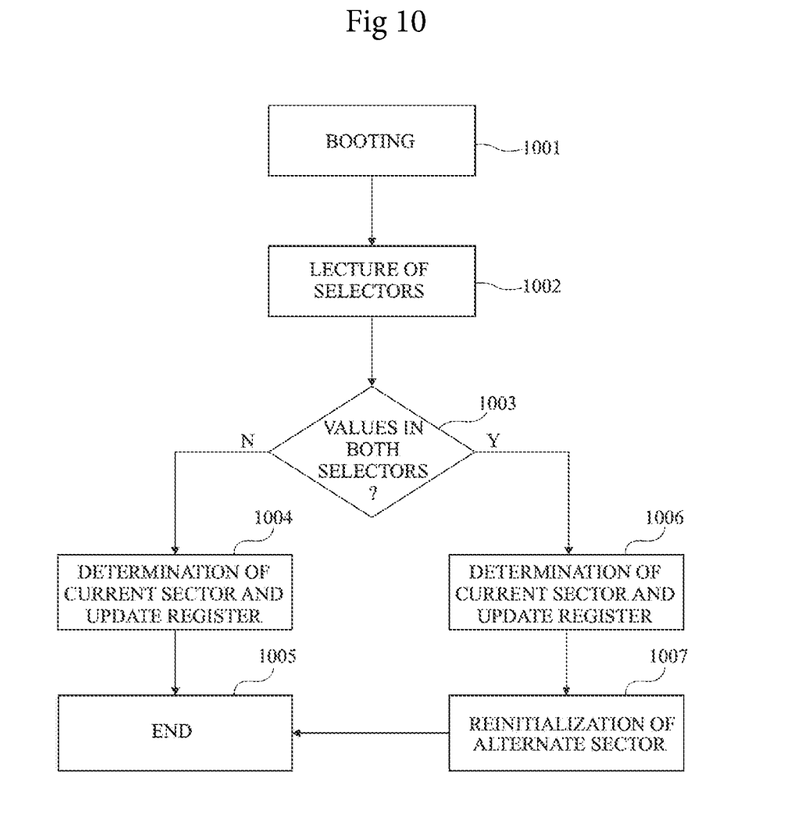
FIG. 10 is a flowchart showing operations after the booting of the FLASH memory according to an example of embodiment of the present disclosure.

FIG. 10 is a flowchart showing operations resulting from the booting of circuit 102.

The device is booted at a step 1001 (BOOTING). After step 1001, the content of locations 126 and 128 is read, for example, by processor 112, at a step 1002 (LECTURE OF SELECTORS).

After step 1002, the method continues at a step 1003 (VALUES IN BOTH SELECTORS?), where it is determined whether the two locations 126 and 128 comprise a selection value, that is, one or the other of the two locations 126 and 128 is not blank. In the case where only a single one of the two locations comprises a selection value (branch N) (for example value SLT2 at location 128, location 126 being blank), the method continues at a step 1004 (DETERMINATION OF CURRENT SECTOR AND UPDATE REGISTER). At step 1004, the sector having its location containing a selection value, for example, sector 122, is determined as being the current sector. Further, the indication contained in register 116 is updated at step 1004.

The method then ends at a step 1005 (END).

If, at step 1003, a selection value is read from each of locations 126 and 128 (branch Y), that is, neither location 126, nor location 128 are blank, the method continues at a step 1006 (DETERMINATION OF CURRENT SECTOR AND UPDATE REGISTER).

When the two locations 126 and 128 each contain a selection value after a booting of memory 104, this means that memory 104 has been powered off during an implementation of step 509, or during an implementation of step 705. Indeed, in this case, after the modification or suppression of one or more data of the current sector, a new selection value is stored in the location of the alternate sector before the complete erasing of the alternate sector. If, for any reason, memory 104 is no longer powered after the storage of the new selection value but before the erasing of the current sector, the two values SLT1 and SLT2 are stored at locations 126 and 128.

At step 1006, a rule is applied to determine which sector is the current sector. As an example, the applied rule is that described in relation with FIG. 1.

As an example, during an implementation of the step 509 of the method of FIG. 5 or during an implementation of the step 705 of the method of FIG. 7, the value of selection of alternate sector 122 is programmed with the counting value, corresponding to the counting value programming the value of selection of the current sector. As an example, if the counting value programming the value of selection of current sector 120 is value 0, the new value, stored at location 128 of alternate sector 122, will be programmed with value 1. Similarly, the new selection value will be programmed with value 2 if the value of current sector 120 is programmed with value 1. The new selection value will be programmed with value 0 if the value of selection of the current sector 120 is programmed with value 2. During the reading of the selection values, sector 122 will then be designated as being the current sector.

Once the current sector has been determined, the indication of the current sector contained in register 116 is updated.

The old data values, for examples, keys KEY 0 to KEY N, still being stored in the sector then designated as the alternate sector, this sector is reinitialized at a step 1007 (REINITIALIZATION OF ALTERNATE SECTOR). The content of the alternate sector, for example, sector 120, is for example integrally erased. Accordingly, the alternate sector contains no further selection value.

The method then ends at step 1005.

An advantage of the described embodiments is that they enable to modify or to partially suppress the content of a FLASH-type memory.

Another advantage of the described embodiments is that it is possible, via software, to select into which sector, current sector or alternate sector, to write one or more data values.

Another advantage of the described embodiments is that the access to memory 104, and in particular to different areas comprised within sectors 120 and 122, is controlled by the incrementation of monotonic counter 110, which improves the security of the data.

Another advantage of the described embodiments is that the content of locations 126 and 128 enabling to determine which sector is the current sector is only accessible by a hardware circuit.

Another advantage of the described embodiments is that an indication of which sector is the current sector is loaded into a register 116 of the circuit at each booting of memory 104 and after a reading of the content of locations 126 and 128.

Various embodiments and variants have been described. Those skilled in the art will understand that certain features of these various embodiments and variants may be combined, and other variants will occur to those skilled in the art. In particular, the selection of the values that the selection values can take is within the abilities of those skilled in the art. Similarly, the selection of the rule enabling to determine, based on the selection values, which is the current sector and which is the alternate sector is within the abilities of those skilled in the art.

Finally, the practical implementation of the described embodiments and variants is within the abilities of those skilled in the art based on the functional indications given hereabove. In particular, regarding the implementation of the access controller.

What is claimed is:

1. A method comprising:
   modifying or suppressing one or more data values of a non-volatile memory,
   wherein the one or more data values are stored in a first sector of the non-volatile memory,
   wherein the first sector is designatable as a current sector or as an alternate sector by one or more selection values stored in the non-volatile memory,
   wherein modifying or suppressing comprises writing the one or more data values into a second sector of the non-volatile memory,
   wherein the second sector is designatable as the current sector or the alternate sector by the one or more selection values, and
   wherein the one or more selection values comprises a first selection value stored in the first sector and a second selection value stored in the second sector; and
   after powering up the non-volatile memory:
      reading the first and second selection values;
      determining, based on the first and second selection values, which sector of the first and second sectors is designated as the alternate sector; and
      when a data value is stored in the alternate sector, reinitializing the alternate sector.

2. The method according to claim 1, wherein modifying or suppressing comprises modifying, in association with a first address, a first data value stored at a first location of the first sector.

3. The method according to claim 2, wherein writing the one or more data values into the second sector comprises writing a second data value to a first location of the second sector, the first location of the second sector being at least partly designated by the first address.

4. The method according to claim 1, wherein modifying or suppressing comprises modifying other first data values, wherein the first sector comprises a first address range comprising the other first data values associated with a first level value as well as a second address range comprising second data values associated with a second level value, the second level value being greater than the first level value.

5. The method according to claim 4, wherein modifying or suppressing comprises suppressing by:
   generating the second level value by a monotonic counter;
   writing the second data values in association with a first counting value in the second sector;
   writing the second selection value into the second sector, designating the first sector as the alternate sector and the second sector as the current sector; and
   reinitializing the first sector.

6. The method according to claim 1, further comprising:
   writing the second selection value into the second sector, designating the first sector as the alternate sector and the second sector as the current sector; and
   reinitializing the first sector.

7. The method according to claim 1, further comprising, after writing one or more other data values into the second sector, modifying or suppressing the one or more other data values stored in the second sector, and writing a third selection value, different from the first and second selection values, into the first sector, designating the first sector as the current sector and the second sector as the alternate sector.

8. The method according to claim 7, wherein each of the first, second, and third selection values is different from the other selection values by values of at least two bits.

9. The method according to claim 1, further comprising:
   reading a state of a bit stored in a register; and
   writing the one or more data values into the current sector when the bit is in a first state; or
   writing the one or more data values into the alternate sector when the bit is in a second state.

10. The method according to claim 1, wherein the non-volatile memory is a FLASH-type memory.

11. A device comprising:
    a non-volatile memory comprising:
       a first sector configured to store one or more data values; and
       a second sector,
       wherein the non-volatile memory is configured to store one or more selection values designating the first sector as a current sector and the second sector as an alternate sector; and
    an access controller configured to modify or suppress the one or more data values by writing one or more other data values into the second sector of the non-volatile memory; and
    a monotonic counter configured to generate a level value,
    wherein the first sector comprises a first address range comprising one or more other first data values associated with a first level value, and a second address range comprising second data values associated with a second level value, and
    wherein the second level value is greater than the first level value.

12. The device according to claim 11, wherein the access controller is configured to modify a first data value stored at a first location of the first sector, in association with a first address, by writing a second data value to a first location at the second sector of the non-volatile memory, and wherein the first location of the second sector is at least partly designated by the first address.

13. The device according to claim 11, wherein the access controller is configured to suppress the one or more other first data values by:
    writing second data values in association with a first counting value into the second sector;
    writing a second selection value, designating the first sector as the alternate sector and the second sector as the current sector; and
    reinitializing the first sector.

14. A method comprising:
    modifying or suppressing one or more data values of a non-volatile memory,
    wherein the one or more data values are stored in a first sector of the non-volatile memory,
    wherein the first sector is designated as a current sector by one or more selection values stored in the non-volatile memory,
    wherein modifying or suppressing comprises writing the one or more data values into a second sector of the non-volatile memory,
    wherein the second sector is designated as an alternate sector by the one or more selection values; and
    after writing one or more other data values into the second sector, modifying or suppressing the one or more other data values stored in the second sector, and writing a third selection value, different from a first selection value and a second selection value, into the first sector, designating the first sector as the current sector and the second sector as the alternate sector.

15. The method according to claim 14, wherein each of the first, second, and third selection values is different from the other selection values by values of at least two bits.

16. The method according to claim 14, wherein modifying or suppressing comprises modifying, in association with a first address, a first data value stored at a first location of the first sector.

17. The method according to claim 16, wherein writing the one or more data values into the second sector comprises writing a second data value to a first location of the second sector, the first location of the second sector being at least partly designated by the first address.

18. The method according to claim 14, wherein modifying or suppressing comprises modifying other first data values, wherein the first sector comprises a first address range comprising the other first data values associated with a first level value as well as a second address range comprising second data values associated with a second level value, the second level value being greater than the first level value.

19. The method according to claim 14, wherein the non-volatile memory is a FLASH-type memory.

* * * * *